(12) United States Patent
Ito et al.

(10) Patent No.: US 11,089,614 B2
(45) Date of Patent: Aug. 10, 2021

(54) WIRELESS COMMUNICATION DEVICE, WIRELESS COMMUNICATION METHOD AND NON-TRANSITORY COMPUTER READABLE MEDIUM

(71) Applicant: Kabushiki Kaisha Toshiba, Minato-ku (JP)

(72) Inventors: Toshio Ito, Kawasaki (JP); Mitsuru Kanda, Kita (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/556,556

(22) Filed: Aug. 30, 2019

(65) Prior Publication Data

US 2020/0221475 A1 Jul. 9, 2020

(30) Foreign Application Priority Data

Jan. 8, 2019 (JP) .............................. JP2019-001200

(51) Int. Cl.
*H04W 72/12* (2009.01)
*H04B 1/69* (2011.01)
(Continued)

(52) U.S. Cl.
CPC .......... *H04W 72/1263* (2013.01); *H04B 1/69* (2013.01); *H04W 24/10* (2013.01); *H04W 48/02* (2013.01); *H04B 2001/6908* (2013.01)

(58) Field of Classification Search
CPC . H04W 72/1263; H04W 48/02; H04W 24/10; H04B 1/69; H04B 2001/6908;
(Continued)

(56) References Cited

U.S. PATENT DOCUMENTS

2005/0163070 A1* 7/2005 Farnham ............. H04W 52/265
370/328
2007/0224935 A1* 9/2007 Waxman ............... H04L 5/0037
455/41.2
(Continued)

FOREIGN PATENT DOCUMENTS

JP 2018-046495 A 3/2018

OTHER PUBLICATIONS

Wang, Q, et al., "6TiSCH Operation Sublayer (6top) Protocol (6P)", RFC 8480, https://datatracker.ietf.org/doc/rfc8480/, Nov. 2018, 50 pages.

*Primary Examiner* — Walter J Divito
(74) *Attorney, Agent, or Firm* — Oblon, McClelland, Maier & Neustadt, L.L.P.

(57) ABSTRACT

A wireless communication device as an embodiment of the present invention is a wireless communication device for performing wireless communications with communication partners while switching channels to be used for each time slot, and includes a storage, an updater, a determinator, and a communicator. The storage stores pre-generated scheduling data indicating channels that can be used in each time slot. The updater determines whether or not each channel included in the scheduling data is usable, and registers the channel determined as unusable on a blacklist. The determinator determines the channel to be used in each time slot on the basis of the scheduling data and the blacklist. The communicator performs wireless communications with a communication partner by using the channel determined in each time slot.

11 Claims, 15 Drawing Sheets

(51) Int. Cl.
*H04W 48/02* (2009.01)
*H04W 24/10* (2009.01)

(58) Field of Classification Search
CPC .......... H04B 1/7136; H04B 2001/7154; H04B 2201/71384; H04B 2201/71323; H04B 1/715
See application file for complete search history.

(56) References Cited

U.S. PATENT DOCUMENTS

| | | | |
|---|---|---|---|
| 2015/0043363 A1* | 2/2015 | Koskinen | H04W 16/14 370/252 |
| 2016/0072548 A1* | 3/2016 | Shih | H04B 1/7143 375/134 |
| 2019/0387499 A1* | 12/2019 | Matthews | H04W 72/0446 |

* cited by examiner

|  | TRACK RECORD DATA | | QUALITY INDICATOR |
|---|---|---|---|
| CHANNEL INDEX | TOTAL PACKET TRANSMISSION NUMBER | PACKET TRANSMISSION SUCCESS NUMBER | PACKET TRANSMISSION SUCCESS RATE |
| 0 | 121 | 109 | 90.0% |
| 1 | 123 | 23 | 18.7% |
| 2 | 119 | 112 | 94.1% |
| 3 | 81 | 11 | 13.1% |

FIG. 2

| DESTINATION | UNUSABLE CHANNEL INDEX LIST | SEQUENCE NUMBER | |
|---|---|---|---|
| A | 2 | 1 | RECEPTION ENTRY FOR NODE A |
| B | 1,3 | 5 | TRANSMISSION ENTRY FOR NODE A |
| C | (BLANK) | 0 | |
| D | 0,1,2 | 3 | |

FIG. 3

TSCH SCHEDULE OF NODE A

|  | TIME SLOT 0 | TIME SLOT 1 | TIME SLOT 2 | TIME SLOT 3 |
|---|---|---|---|---|
| CHANNEL OFFSET 0 |  | Tx B |  | Tx, Rx B |
| CHANNEL OFFSET 1 |  | Tx B |  |  |
| CHANNEL OFFSET 2 |  | Tx B |  |  |
| CHANNEL OFFSET 3 |  | Tx B |  |  |

TSCH SCHEDULE OF NODE B

|  | TIME SLOT 0 | TIME SLOT 1 | TIME SLOT 2 | TIME SLOT 3 |
|---|---|---|---|---|
| CHANNEL OFFSET 0 |  | Rx A |  | Tx, Rx A |
| CHANNEL OFFSET 1 |  | Rx A |  |  |
| CHANNEL OFFSET 2 |  | Rx A |  |  |
| CHANNEL OFFSET 3 |  | Rx A |  |  |

FIG. 5

TSCH SCHEDULE OF NODE A

|  | TIME SLOT 0 | TIME SLOT 1 | TIME SLOT 2 | TIME SLOT 3 |
|---|---|---|---|---|
| CHANNEL OFFSET 0 |  | Tx B |  | Tx, Rx NoBL B |
| CHANNEL OFFSET 1 |  | Tx B |  |  |
| CHANNEL OFFSET 2 |  | Tx B |  |  |
| CHANNEL OFFSET 3 |  | Tx B |  |  |

TSCH SCHEDULE OF NODE B

|  | TIME SLOT 0 | TIME SLOT 1 | TIME SLOT 2 | TIME SLOT 3 |
|---|---|---|---|---|
| CHANNEL OFFSET 0 |  | Rx A |  | Tx, Rx NoBL A |
| CHANNEL OFFSET 1 |  | Rx A |  |  |
| CHANNEL OFFSET 2 |  | Rx A |  |  |
| CHANNEL OFFSET 3 |  | Rx A |  |  |

FIG. 9

| DESTINATION | CHANNEL INDEX | TOTAL PACKET NUMBER | PACKET SUCCESS NUMBER | PACKET TRANSMISSION SUCCESS RATE |
|---|---|---|---|---|
| B | 0 | 121 | 109 | 90.0% |
| B | 1 | 123 | 23 | 18.7% |
| B | 2 | 119 | 112 | 94.1% |
| B | 3 | 81 | 11 | 13.1% |
| C | 0 | 45 | 8 | 17.8% |
| C | 1 | 66 | 10 | 15.2% |
| C | 2 | 60 | 11 | 18.3% |
| C | 3 | 58 | 57 | 98.2% |
| D | 0 | ... | ... | ... |
| D | 1 | ... | ... | ... |
| D | 2 | ... | ... | ... |
| D | 3 | ... | ... | ... |

FIG. 12

WIRELESS COMMUNICATION DEVICE, WIRELESS COMMUNICATION METHOD AND NON-TRANSITORY COMPUTER READABLE MEDIUM

CROSS-REFERENCE TO RELATED APPLICATION (S)

This application is based upon and claims the benefit of priority from Japanese Patent Application No. 2019-001200, filed Jan. 8, 2019; the entire contents of which are incorporated herein by reference.

FIELD

Embodiments described herein relate generally to a wireless communication device, a wireless communication method and non-transitory computer readable medium.

BACKGROUND

In wireless communications with TSCH (Time-Slotted Channel Hopping) scheme defined in IEEE 802.15.4, a channel (wireless frequency band) to be used is set for each time slot, and wireless communication devices switch the channel to be used for each time slot. That is, while there are a plurality of channels used by the wireless communication devices, one of the plurality of channels is used in each time slot. In the scheme, when there is even one channel having an interference radio wave from outside out of the plurality of channels, communication fails and the communication success rate is deteriorated. Therefore, it is difficult to use the TSCH scheme for applications (for example, for controlling industrial robots in plants) requiring high reliability.

With an existing method for corresponding to such problem, the channel having the interference radio wave is recognized, and a TSCH schedule indicating the channels to be used in each time slot is updated so that communications are performed with avoiding such channel. The existing methods, however, have shortcomings such that it takes time for updating the TSCH schedule and that the communication load of the wireless communication devices performing update increases as the number of wireless communication devices included in a TSCH wireless communication network increases.

BRIEF DESCRIPTION OF THE DRAWINGS

FIG. 2 is a table illustrating an example of a channel quality table;

FIG. 3 is a table illustrating an example of a blacklist;

FIG. 5 is a schematic diagram illustrating examples of a TSCH schedule;

FIG. 9 is a schematic diagram illustrating examples of a TSCH schedule when taking an exceptional measure;

FIG. 12 is a table illustrating an example of a transmission channel quality table;

DETAILED DESCRIPTION

An embodiment of the present invention provides a device capable of suppressing deterioration in the success rate of communications without updating TSCH schedules.

A wireless communication device as an embodiment of the present invention is a wireless communication device for performing wireless communications with communication partners while switching channels to be used for each time slot, and includes a storage, an updater, a determinator, and a communicator. The storage stores pre-generated scheduling data indicating channels that can be used in each time slot. The updater determines whether or not each channel included in the scheduling data is usable, and registers the channel determined as unusable on a blacklist. The determinator determines the channel to be used in each time slot on the basis of the scheduling data and the blacklist. The communicator performs wireless communications with a communication partner by using the channel determined in each time slot.

Below, a description is given of embodiments of the present invention with reference to the drawings. The present invention is not limited to the embodiments.

First Embodiment

Figure 1:
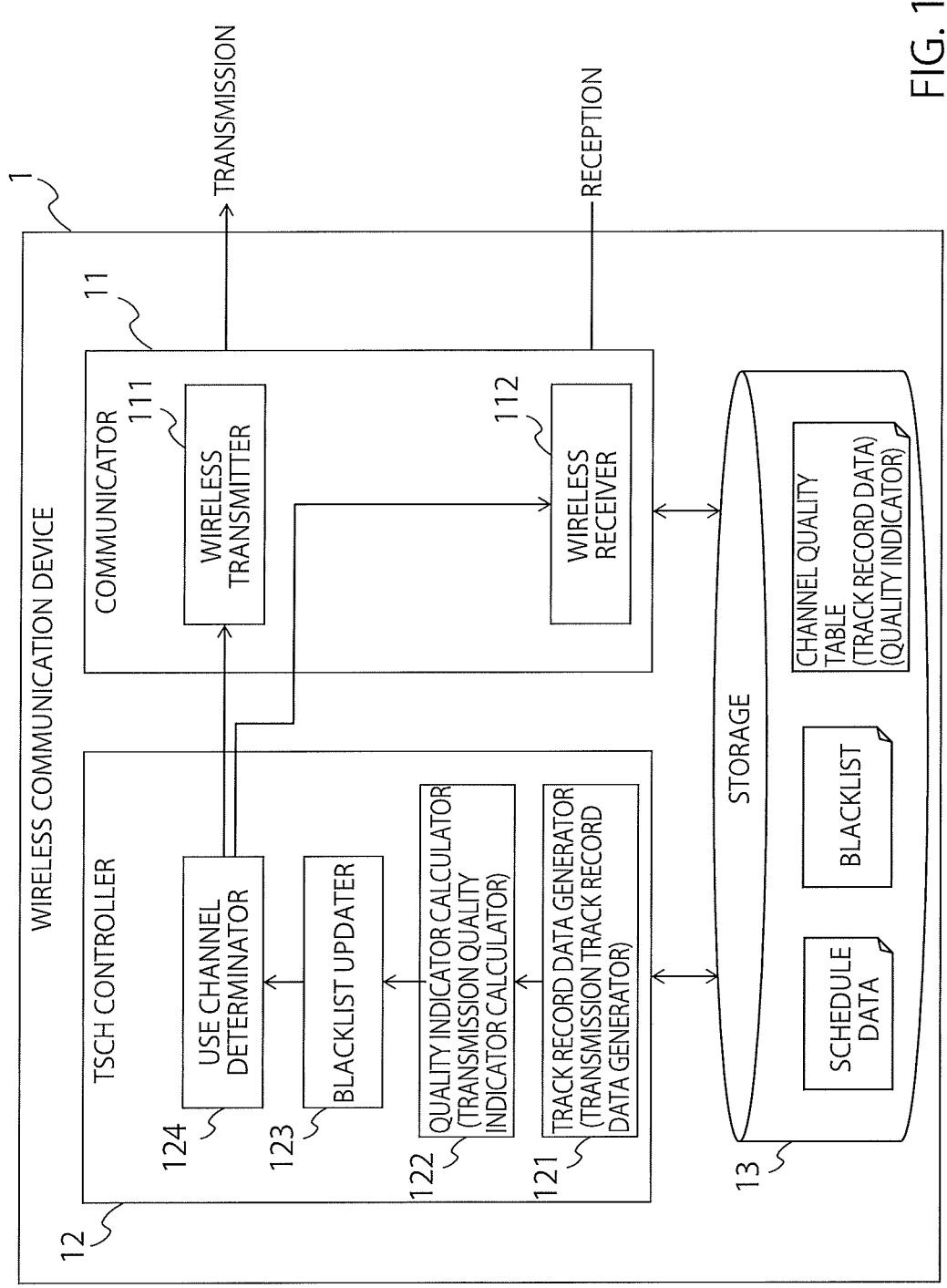
FIG. 1 is a block diagram illustrating an example of a wireless communication device according to a first embodiment.

FIG. 1 is a block diagram illustrating an example of a wireless communication device according to a first embodiment. A wireless communication device 1 according to the first embodiment includes a communicator 11, a TSCH controller 12, and a storage 13. The communicator 11 includes a wireless transmitter 111 and a wireless receiver 112. The TSCH controller 12 includes a track record data generator (transmission track record data generator) 121, a quality indicator calculator (transmission quality indicator calculator) 122, a blacklist updater 123, and a use channel determinator 124.

In the embodiment, it is assumed that there is a wireless communication network to which a plurality of wireless communication devices 1 belong, and each of the wireless communication devices 1 mutually performs wireless communications via the TSCH (Time-Slotted Channel Hopping) scheme. Note that the wireless communication device 1 is also referred to as a node, because it belongs to the wireless communication network.

With the TSCH scheme, communication timing of each node is determined with TDMA (Time-Division Multiple Access). With the TSCH scheme, time is divided into time slots of a specific interval (for example, 10 milliseconds), and each node switches a channel to be used for having wireless communications with a certain communication partner by each time slot. Data indicating that the node communicates with which communication partner in which time slot by using which channel is a TSCH schedule (schedule data). That is, the wireless communication device 1 recognizes the channel to be used on the basis of the TSCH schedule.

With the TSCH scheme, when there is an interference radio wave from outside existing in even one of a plurality of channels, communications are to fail so that the success rate of communications is deteriorated. For such case, there is discussed a method for updating the TSCH schedule so that only the channels having no interference radio wave are to be used.

With the method in which a specific node centrally updates the TSCH schedules, however, the specific node collects data of the communication quality and the like from all the nodes of the network and generates the TSCH schedules of all the nodes. Therefore, in accordance with the increase in the number of nodes belonging to the wireless communication network, communication load and calculation load of the specific node are increased.

Further, with a method in which each node updates the TSCH schedule in an autonomous decentralized manner, each node is required to perform communications with other nodes regarding the TSCH schedules. For example, with a communication protocol "6P" that is one of the methods for controlling the TSCH schedule, each node performs at least one back-and-forth exchange of unicast packets with each of other nodes (that is, transmits a transmission packet and receives a response packet). Therefore, it takes time for controlling the TSCH schedules. Further, in accordance with an increase in the number of the other nodes, the communication volume is increased.

Therefore, in the embodiment, each of the wireless communication devices 1 is designed to be able to select the channel in an autonomous decentralized manner, while deterioration in the communication efficiency is suppressed, e.g. the time, the load, and the communication volume regarding processing to be executed therefore. Specifically, in the embodiment, when a channel not preferable to be used is recognized, the TSCH schedule is not updated but such channel is registered on a blacklist. Then, the channel to be used is determined on the basis of the blacklist to avoid such channel. Detail thereof will be described later along with structural components of the wireless communication device 1.

In the embodiment, the TSCH schedule is generated in advance for each node before starting wireless communications for enabling each node to communicate properly, and is stored in the storage 13 of each node. A specific node may generate the TSCH schedules centrally, or each node may generate the TSCH schedule in an autonomous decentralized manner. Alternatively, an external device not belonging to the wireless communication network may generate the TSCH schedules. While there is no restriction in regards to the method for generating the TSCH schedule, it is assumed in the generated TSCH schedule that there is necessarily a timing at which there are a plurality of usable channels for a certain communication partner. Detail of the TSCH schedule will be described later.

The structural components of the wireless communication device 1 will be described. The communicator 11 performs wireless communications according to control of the TSCH controller 12. The TSCH controller 12 controls the communicator 11 to be able to perform wireless communications under the TSCH scheme. The storage 13 at least stores data necessary for performing wireless communications under the TSCH scheme such as the TSCH schedule. Note that description of the processing used in typical wireless communications such as generation of packets is omitted, and structural components performing such processing are also omitted from FIG. 1.

The wireless transmitter 111 transmits a packet to a designated communication partner in a designated time slot via a designated channel. The wireless receiver 112 receives a packet from a designated communication partner in a designated time slot and via a designated channel. As defined in general, the wireless communication device 1 upon receiving a packet returns an ACK packet in response to receiving the packet. Therefore, the wireless receiver 112 receives the ACK packet from the communication partner. The time slot and the channel are designated by the use channel determinator 124.

The track record data generator 121 generates track record data regarding wireless transmission to the communication partner. For example, it is considered that the track record data generator 121 counts, in each of the used channels, the packets transmitted to the communication partner and the ACK packets received from the communication partner to include them as the track record data. Note that the track record data may be any data capable of calculating an indicator indicating the quality of the channels. Examples thereof may be the number of times the communication partner receives wrong data, and intensity of background wireless signals observed right before transmission. While a case of generating the track record data without distinguishing the communication partners herein, the track record data may be generated for each of the communication partners.

The quality indicator calculator 122 calculates the indicator indicating the quality of the channels for each of the used channels on the basis of the track record data. Such indicator is referred to as a quality indicator. For example, the packet transmission success rate, the bit error rate, the background wireless signal intensity, and the like may be considered as the quality indicators.

FIG. 2 is a table illustrating an example of a channel quality table. The channel quality table is a table indicating the track record data and the quality indicator. It is assumed that each node has such channel quality table.

In the channel quality table as the example illustrated in FIG. 2, the total packet transmission number and packet transmission success number as the track record data and the packet transmission success rate as the quality indicator are presented for each channel index. The channel index is the number given to the channel to be used. The total packet transmission number expresses the number of transmission packets transmitted to the communication partner by using the corresponding channel. The packet transmission success number expresses the number of received ACK packets that are returned in response to the transmission packets. Note that the transmission packet and the ACK packet corresponding to the transmission packet are not necessarily transmitted and received via a same channel. Therefore, it is to be noted that the packet transmission success number in each row (each entry) of the channel quality table is not the number of ACK packets received via the channel corresponding to the channel index of the same entry. For example, the packet transmission success number in a row where the channel index is "0" is not the number of ACK packets received via the channel of the channel index "0" but the number of received ACK packets corresponding to the transmission packets transmitted via the channel of the channel index "0".

In the case of the example illustrated in FIG. 2, the track record data generator 121 increments the total packet transmission number of the channel used for transmission by 1 every time the packet is transmitted, and increments the packet transmission success number of the channel used for transmission of the packets by 1 every time the ACK packet corresponding to the packet is received from the communication partner. Then, in the case of the example of FIG. 2, the quality indicator calculator 122 calculates the packet transmission success rate of the channel used for transmission by dividing the packet transmission success number corresponding to the channel used for transmission by the total packet transmission number corresponding to the channel used for transmission. In this manner, the channel quality table is generated.

Note that the total packet transmission number and the success number in the channel quality table may be limited to be of a specific time zone. For example, the track record data generator 121 may record the total packet transmission number and the success number observed within past one hour. Alternatively, the total packet transmission number and the success number may be reset to "0" by every one hour and restart to count the total number and the success number. While the success rate cannot be calculated when the total packet transmission number is "0", it may be defined not to calculate the quality indicator in such case.

The blacklist updater 123 determines whether or not each channel included in the TSCH schedule is usable, and registers the channel determined to be unusable on the blacklist. Whether or not each channel is usable is determined on the basis of the quality indicator of each channel. For example, when the quality indicator of a given channel satisfies a condition for being registered on the blacklist, the blacklist updater 123 registers the channel on the blacklist.

FIG. 3 is a table illustrating an example of the blacklist. In the blacklist of FIG. 3, packet destinations, an unusable channel index list, and sequence numbers are presented. The entry of a first row indicates that the channel of channel index "2" is unusable when the packet destination is node "A".

The blacklist includes two kinds of entries that are an entry in which own node is the destination of the packet and an entry in which another node is the destination of the packet. The entry in which the own node is the destination of the packet indicates the channel that is unusable when receiving the packet from another node. The entry in which another node is the destination of the packet indicates the channel that is unusable when transmitting the packet to another node. Hereinafter, the entry in which the own node is the destination of the packet is referred to as a reception entry, and the entry in which another node is the destination of the packet is referred to as a transmission entry. When the node A has the blacklist illustrated in FIG. 3, the first row corresponds to the reception entry, and the second to fourth rows correspond to the transmission entry.

When the quality indicator is generated by the quality indicator calculator, the blacklist updater 123 determines whether or not to register the channel index related to the quality indicator on the unusable channel index list of the reception entry on the basis of the quality indicator. When determined to register, the blacklist updater 123 registers the channel on the unusable channel index list of the reception entry. That is, the channel is registered as the channel not to be used for reception. When registering on the unusable channel index list, the corresponding sequence number is incremented by 1.

The method for determining whether or not to register on the unusable channel index list, that is, the condition for registering on the blacklist, may be defined as appropriate according to specifications and the like required for the wireless communication device 1. For example, when the packet transmission success rate is lower than a threshold value set in advance, the channel index related to the packet transmission success rate may be added to the unusable channel index list. Like the manner described above, determination may be done according to absolute evaluation. Alternatively, determination may be done by comparing a certain packet transmission success rate with a representative value of the other packet transmission success rates. That is, determination may be done according to relative evaluation. The representative value may be a general value such as the maximum value, the minimum value, the center value, or the average value.

Note that the channel quality table illustrated in FIG. 2 is generated by node "B" and the packet transmission success rates of the channel indexes "1" and "3" in FIG. 2 are markedly lower than those of the channel indexes "0" and "2". Therefore, it is assumed that the channel indexes "1" and "3" are registered on the unusable channel index list of the entry regarding the node B illustrated in FIG. 3.

When the reception entry of the blacklist is updated, each node at least transmits the entry to the communication partner. For example, when the node A updates the entry of the first row in FIG. 3, the entry of the first row in FIG. 3 is transmitted from the node A to the nodes B, C, and D. Then, the nodes B, C, and D update the transmission entry regarding the node A in the received entry on the respective blacklist.

Figure 4:
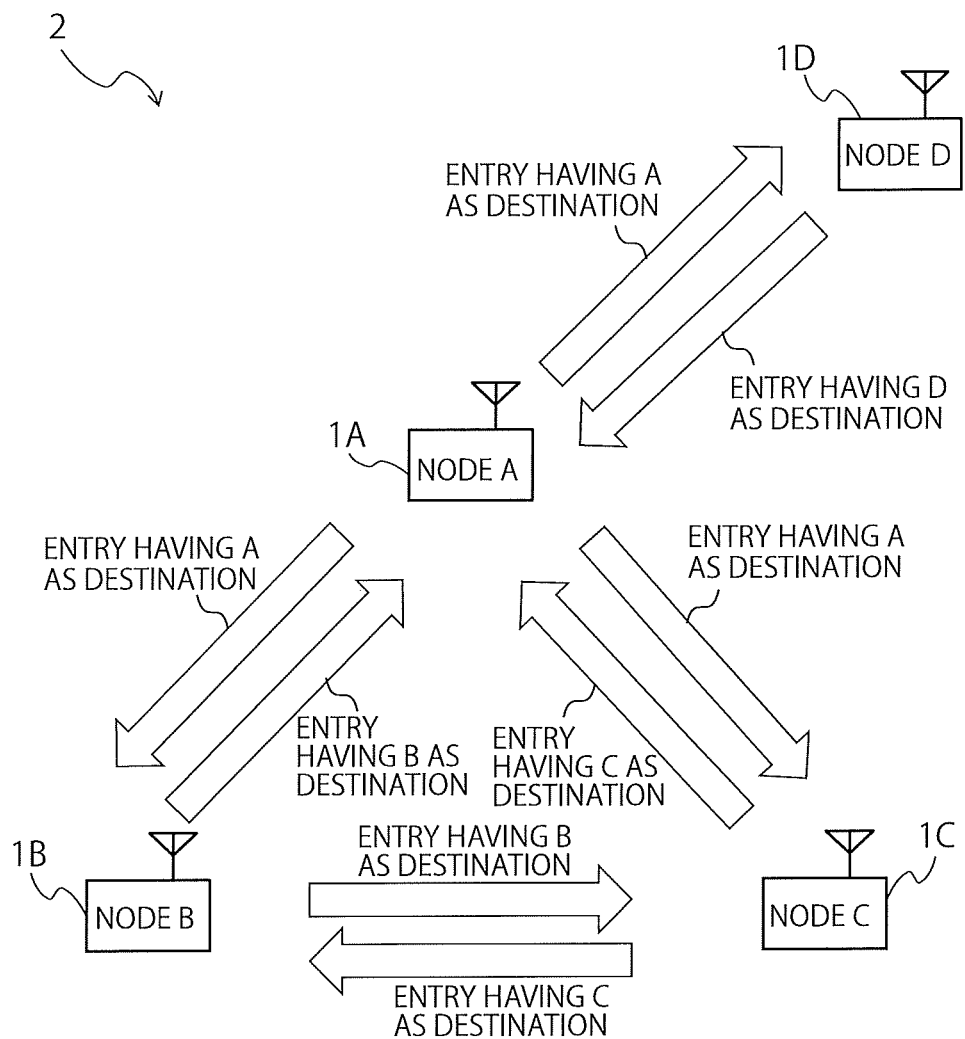
FIG. 4 is a chart for describing transmission of the blacklist.

FIG. 4 is a chart for describing transmission of the blacklist. In an example of FIG. 4, there are four wireless communication devices 1 (wireless communication devices 1A to 1D) for the wireless communication network 2. In other words, there are four nodes A to D in the wireless communication network 2. The node A is neighboring to each of the nodes B to D. In the meantime, the node D is not neighboring to the nodes B and C, and it is assumed that the node D does not communicate with the nodes B and D.

The node A transmits the entry in which the destination is the node A to the nodes B, C, and D which are the communication partners. In the same manner, each of the nodes B, C, and D transmits the entry in which the destination is the own node to the node A. The node A updates the blacklist such that the entries received from the nodes B, C, and D become the transmission entries of the own blacklist. Thereby, on the blacklist of the node A, there are two kinds of entries that are the reception entry in which the own node is the destination and the transmission entry in which the other nodes are the destinations as illustrated in FIG. 3.

As described above, the node B does not directly communicate with the node D. Therefore, the node B does not need to hold the entry regarding the node D. Therefore, the node A does not need to transmit the entry regarding the node D (entry of the fourth row in FIG. 3) to the node B. Further, the node B acquires the entry regarding the node C from the node C, so that the node A does not need to transmit the entry regarding the node C (entry of the second row in FIG. 3) to the node B. Further, the entry regarding the node B (entry of the second row in FIG. 3) is generated by the node B, so that the node A does not need to transmit the entry to the node B. As described, each node does not have to transmit the whole blacklist but may have to transmit the reception entry on the blacklist only to the communication partner. That is, only a necessary part of the blacklist may be transmitted, thereby making it possible to reduce the communication volume, the processing load, and the like compared to the case of sharing the whole blacklist.

Note that the blacklist updater 123 of each node replaces the existing entry with the received entry, when the sequence number of the entry received from the communication partner is larger than the sequence number of the held entry. The larger the sequence number, the newer the entry, so that it is possible to prevent the entry from being replaced with the old entry thereby.

While transmission for sharing the blacklist may be done by unicasting, it is more preferable to be done by broadcasting. With broadcasting, ACK is not necessary, and transmission can be done to all the neighboring nodes at once. Therefore, the use of broadcasting makes it possible to share the blacklist promptly while suppressing the communication volume of the wireless communication network.

The use channel determinator 124 determines the channel to be used in each time slot on the basis of the TSCH schedule (scheduling data) and the blacklist. Note that the channel used when receiving the packet from the communication partner is determined based on the TSCH schedule and the reception entry. The channel used when transmitting the packet to the communication partner is determined on the basis of the TSCH schedule and the transmission entry. The channel to be used is informed to the communicator 11. Thereby, the communicator can perform wireless communications with the communication partner by using the channel determined in each time slot.

FIG. 5 is a schematic diagram illustrating examples of the TSCH schedule. In FIG. 5, the TSCH schedules for each of two nodes (Node A and node B) are illustrated. The TSCH schedule is expressed as a matrix based on time slots shown in the lateral direction of the table and channel offsets shown in the longitudinal direction of the table. An element (a lattice part defined by a single time slot and a single channel offset) of the matrix is referred to as a "cell". The time slots and the channel offsets in the TSCH schedule are common to each of the nodes.

The channel offset is a parameter used for calculating the channel index. The channel index is calculated on the basis of the value (number) of the channel offset and ASN (Absolute Slot Number) of the time slot. ASN of the time slot is the number (serial number) allotted to the time slots sequentially from a prescribed start time. ASN of the time slot at the start time is "0", and the number incremented by 1 is allotted to the time slots thereafter. Therefore, the corresponding channel varies even with the same channel offset when the time slot is different.

Specifically, a channel corresponding to a cell is determined by following expressions.

[EXPRESSION 1]

$$\text{Channel} = \text{macHoppingSequnceList [Index]} \quad (1)$$

$$\text{Index} = (\text{macASN} + \text{macChannelOffset}) \% \text{ macHoppingSequenceLength} \quad (2)$$

"macHoppingSequenceList" in Expression (1) expresses the list of channels that may be used in the whole TSCH schedule. "Index" is the channel index. "macHoppingSequenceList [Index]" expresses processing for extracting the "Index"-th element of the list. Meanwhile, "macHoppingSequenceLength" in Expression (2) expresses the number of elements of "macHoppingSequenceList", that is, the total number of channels that may be used in the whole TSCH schedule. "macASN" expresses ASN corresponding to the cell. "macChannelOffset" expresses the channel offset corresponding to the cell. The sign "%" expresses modulo calculation. A remainder when a constant "a" is divided by a constant "b" is expressed as "a % b".

As seen from the expressions above, "Index" changes according to "ASN", so that corresponding channels vary even for the cells of the same channel offset when the time slots are different. In the same manner as, "Index" changes according to "channel offset", so that corresponding channels vary even for the cells of the same time slot when the channel offsets are different.

In the wireless communication network using the TSCH scheme, the time slot is defined by taking an arbitrary point shared in the whole network (that is, the all nodes) as the start point. The all nodes participating in the network mutually perform time synchronization and share the start time of the time slot. Each of the nodes considers the start time as the starting time of the slot "0" of the TSCH schedule, and repeats the TSCH schedule as the time passes. That is, in the example of FIG. 5, after the time slot "3", it is returned to the time slot "0".

Further, in the TSCH schedule, there is a cell presenting the setting to be followed when performing communications. Such cell is referred to as a "scheduled cell" hereinafter. The setting to be followed when performing communications is the communication partner and the communication directions thereof when performing communications in the time slot and the channel corresponding to the cell. The communication directions include transmission, reception, and the both. In the example of FIG. 5, "A" and "B" shown in the cells denote the communication partners. A sign "Tx" is a flag meaning "transmission", and indicates to transmit a packet to the communication partner when there is the packet planned to be transmitted. Further, a sign "Rx" is a flag meaning "reception", and indicates a possibility of receiving the packet from the communication partner. When both the TX flag and the RX flag are shown, it means that either "transmission" or "reception" is to be performed.

For example, in the TSCH schedule of the node A, "Tx, RX B" is shown in the scheduled cell corresponding to a combination of the channel offset "0" and the time slot "3". This means that "the node A performs communications with the node B by using the channel corresponding to the cell in a period of the time slot "3." For example, when the node A has a packet that is planned to be transmitted to the node B in the period of the time slot "3", the node A transmits the packet to the node B by using the channel corresponding to the cell. If not, the node A stands by for being able to receive the packet because node B may transmit a packet using the channel corresponding to the cell.

Hereinafter, with signs "i" and "j" expressing non-negative integers, a combination of the i-th channel offset and the j-th time slot is denoted as (i, j). The cell corresponding to a combination of the channel offset "0" and the time slot "3" is denoted as the cell (0, 3).

Further, in the example of FIG. 5, all the scheduled cells corresponding to the time slot "1" indicate the same setting. As in this case, existence of a plurality of scheduled cells of the same setting in the same time slot means that there are a plurality of useable channels.

The use channel determinator 124 refers to such TSCH schedule, and selects one of the scheduled cells in each of the time slots. Thereby, the communication setting in each of the time slots is determined. When there are a plurality of selectable scheduled cells, one is selected according to a specific algorithm.

However, there is a risk of selecting the channel included on the blacklist when following the selected scheduled cell. Therefore, the use channel determinator 124 excludes the scheduled cells corresponding to the channels included on the blacklist from selection candidates so that such scheduled cell is not selected. In the manner described above, the channel not included on the blacklist is determined as the channel to be used.

As an example, there is considered a case where a packet is transmitted from the node A to the node B at the point of "ASN=17." First, the use channel determinator 124 distinguishes the time slot corresponding to "ASN=17." As described above, the TSCH schedule is repeated as the time passes. Assuming herein that there are four time slots included in a single TSCH schedule as in FIG. 5, the time slot to be referred is the time slot "1" because "ASN %4=1."

In the TSCH schedule of the node A, there are four scheduled cells having the node B as the communication partner in the time slot "1". Those scheduled cells are the candidates to be selected. The scheduled cells as the candidates to be selected are referred to as "candidate cells". That is, the use channel determinator 124 includes such four scheduled cells in the candidate cells.

The channel index of such candidate cell can be acquired from the above-described expressions as "Index=(17+macChannelOffset) %4." That is, the channel indexes of the cells with the offsets of "0", "1", "2", and "3" are "1", "2", "3", and "0", respectively. Referring to the blacklist of FIG. 3, the communication partner of current time is the node B, so that the channel indexes "1" and "3" are defined to be unusable. Therefore, the cells of the channel offsets "0" and "2" corresponding to those channel indexes are excluded from the candidate cells.

The use channel determinator 124 selects the channel from the remaining candidate cells according to a selection algorithm. For example, when selecting the channel of the smallest channel offset, the smallest channel offset remaining as the candidate cell is "1" so that the channel corresponding to the channel index "2" is selected. Thereby, the node A transmits the packet to the node B via the channel corresponding to the channel index "2" at the point of "ASN=17."

In the meantime, the node B also needs to be able to receive the packet from the node A at the point of "ASN=17." However, as illustrated in FIG. 5, the setting of the TSCH schedule of the node B is corresponding to the setting of the TSCH schedule of the node A so as to be able to receive the packet from the node A. The cell showing the node B as the communication partner in the TSCH schedule of the node A shows the node A as the communication partner in the TSCH schedule of the node B. Similarly, the cell showing the "Tx" flag in the TSCH schedule of the node A shows the "Rx" flag in the TSCH schedule of the node B. Further, the channel selection algorithm is common to each of the nodes, and the transmission entry of the node A for the node B is the same as the reception entry of the node B. Therefore, like the node A, the node B selects the channel corresponding to the channel index "2" at the point of "ASN=17." Thereby, the node B receives the packet from the node A via the channel corresponding to the channel index "2" at the point of "ASN=17." In this manner, the same channel is selected on the transmission side and the reception side in the same time slot even when there are plurality of usable channels, so that it is possible to perform proper communications while avoiding low-quality channels.

While it is also considered to inform the channel to be used to the communication partner just before the node transmits the packet, it takes time for communications and the communication volume is also increased. Therefore, like the embodiment, it is preferable for each of the nodes to determine the channel for performing communications according to the common algorithm.

As described above, in the embodiment, it is assumed that there is necessarily a time slot in which a plurality of useable channels exist for a certain communication partner. For example, referring to the TSCH schedule of the node A in FIG. 5, there is only one channel that can be used in the time slot "3", while it is possible to select a channel to be used from the four usable channels in the time slot "1." Therefore, the TSCH schedule according to the embodiment is not the scheduling data indicating the channels that should be used in the time slots but the scheduling data indicating the usable channels in the time slots.

Note that the cell that is not the scheduled cell is denoted as a "Blank Cell". The Blank Cell means that there is no plan of performing communications in the corresponding time slot and channel. In the example of FIG. 5, neither the node A nor the node B has the scheduled cells in the time slots "0" and "2." Therefore, the node A and the node B can put the communication function in a sleep mode in the time zone corresponding to the time slot "0" and the time zone corresponding to the time slot "2."

When there is only one usable channel and that channel is included on the black list, the channel corresponding to the Blank Cell may be determined as the channel to be used as long as it is not an obstruction to communications of other nodes. That is, there may be a case where the channel corresponding to the Blank Cell is determined as the channel to be used.

In this manner, the channel to be used in each of the time slots for communicating with a certain communication partner is determined. Then, the channel determinator indicates the time slot and the channel for performing communications to the wireless transmitter 111 and the wireless receiver 112 for each communication partner. Thereby, each of the wireless transmitter 111 and the wireless receiver 112 can perform transmission and reception with the TSCH scheme.

Note that the data stored in the storage 13 is not specifically limited. For example, the processing results of each structural component of the wireless communication device 1 such as the blacklist and the track record data (or the channel quality table) may be stored in the storage 13 at any time, and each structural component may acquire the processing results by referring to the storage 13.

Figure 6:
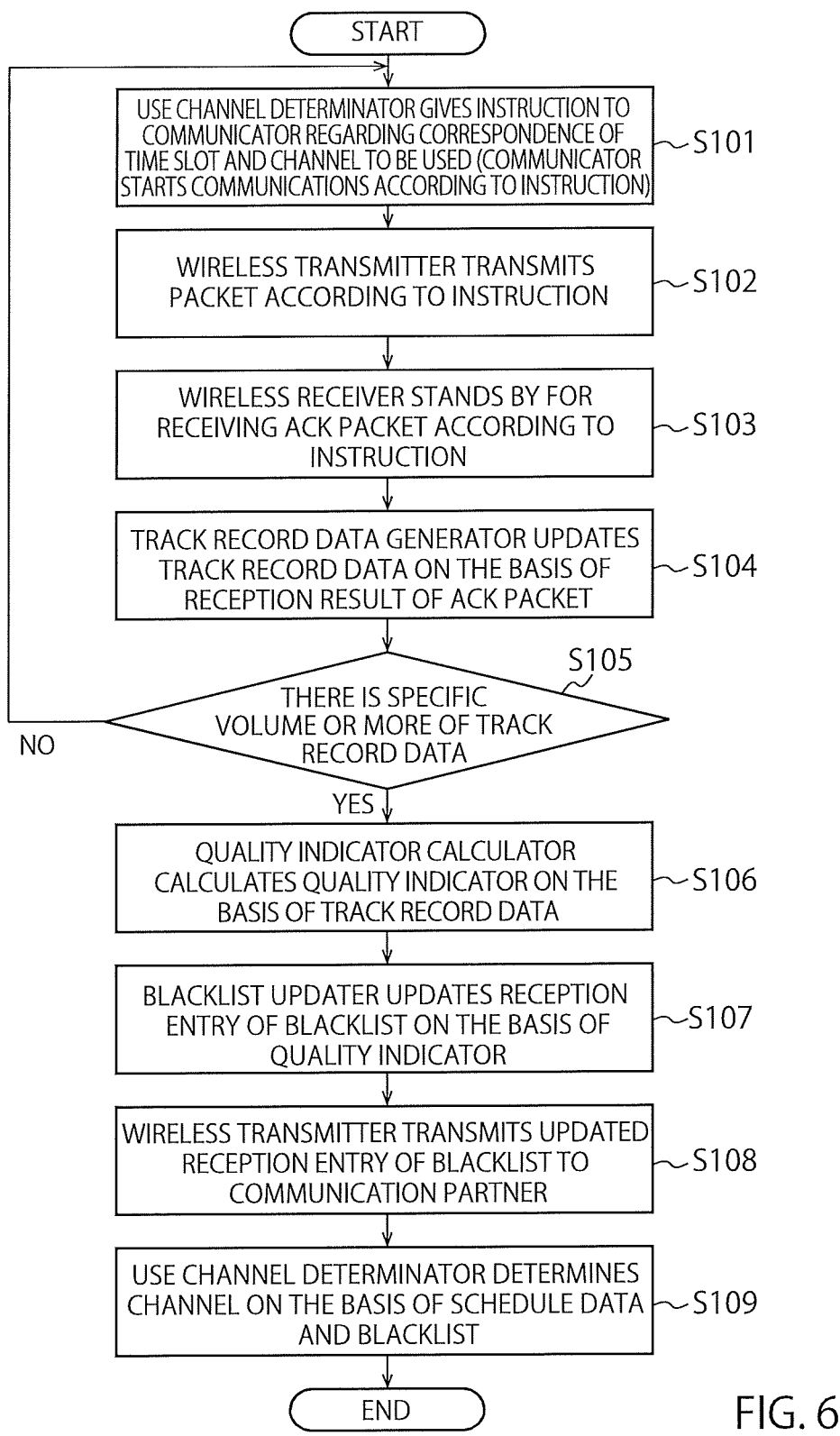
FIG. 6 is a schematic flowchart of a series of processing regarding update of a reception entry according to the first embodiment.

Next, flow of each processing of the structural components will be described. FIG. 6 is a schematic flowchart of a series of processing regarding update of the reception entry according to the first embodiment. In this flow, described is a case where the transmission success rate of the packets is taken as the quality indicator.

The use channel determinator 124 instructs the communicator 11 which time slot and channel to be used for wireless communications (S101). According to the instruction, the wireless transmitter 111 transmits a packet to the communication partner in the designated time slot and channel (S102). Thereby, an ACK packet is returned from the communication partner, so that the wireless receiver 112 stands by for receiving the ACK packet from the communication partner according to the instruction (S103). When the ACK packet is actually received or a certain period has passed from transmission of the packet without receiving the ACK packet, the processing is shifted to a next process. The track record data generator 121 updates the packet transmission success number and the total packet transmission number for each channel index to update the track record data (S104). The packet transmission success number is counted when the ACK packet is received, while the packet transmission success number is not counted when the period has passed from transmission of the packet without receiving the ACK packet. Then, when the track record data is not equal to or more than a specific volume (NO in S105), the processing is returned to the first process. In this manner, the processing from S101 to S104 is repeated and, when the track record data is accumulated to the specific volume or more (YES in S105), the quality indicator calculator 122 calculates the transmission success rate on the basis of the track record data (S106).

The blacklist updater 123 updates the reception entry of the blacklist on the basis of the transmission success rate (S107). For example, when the transmission success rate is below a lower limit vale, the blacklist updater 123 registers the channel index corresponding to the transmission success rate to the reception entry. The updated reception entry is transmitted to the communication partner by the wireless transmitter 111 (S108). Then, the use channel determinator 124 determines the channel on the basis of the TSCH schedule and the blacklist (S109). Thereby, the flow is completed and, when an unusable channel is registered on the blacklist anew, the decision of the channel determinator is changed in the next flow.

Figure 7:
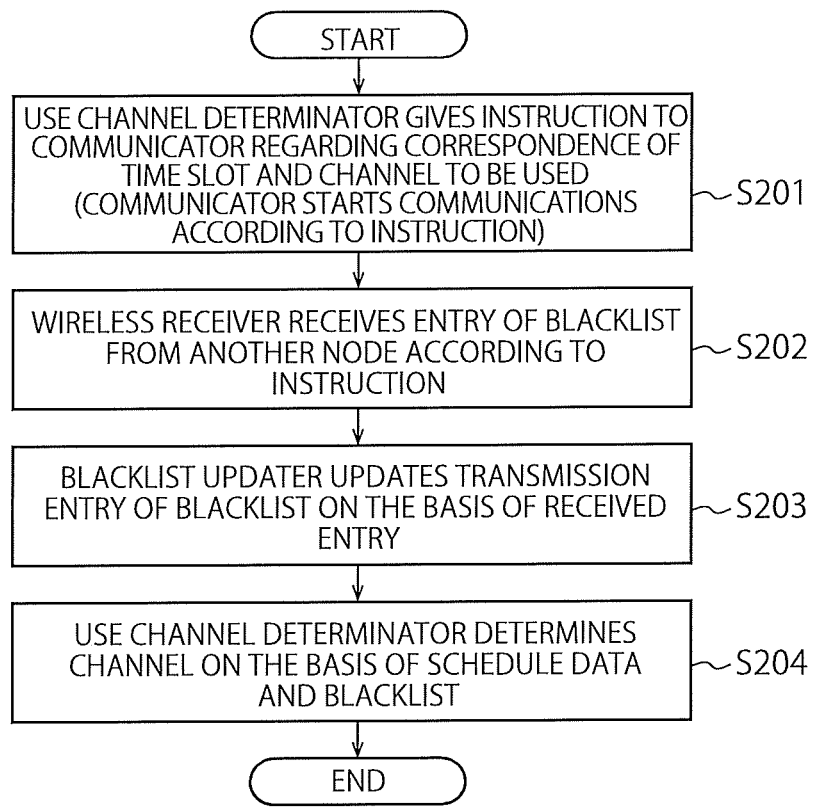
FIG. 7 is a schematic flowchart of a series of processing regarding update of a transmission entry according to the first embodiment.

FIG. 7 is a schematic flowchart of a series of processing regarding update of the transmission entry according to the first embodiment.

The use channel determinator 124 instructs the communicator 11 which time slot and channel to be used for wireless communications (S201). According to the instruction, the wireless transmitter 111 receives the entry of the blacklist from another node in the designated time slot and channel (S202). Those entry is the reception entry for the other node but is the transmission entry for the own node. The blacklist updater 123 updates the transmission entry of the blacklist on the basis of the received entry (S203). Then, the use channel determinator 124 determines the channel on the basis of the TSCH schedule and the blacklist (S204). Thereby, the flow is completed and, when an unusable channel is registered on the blacklist anew, the decision of the channel determinator is changed in the next flow.

Figure 8:
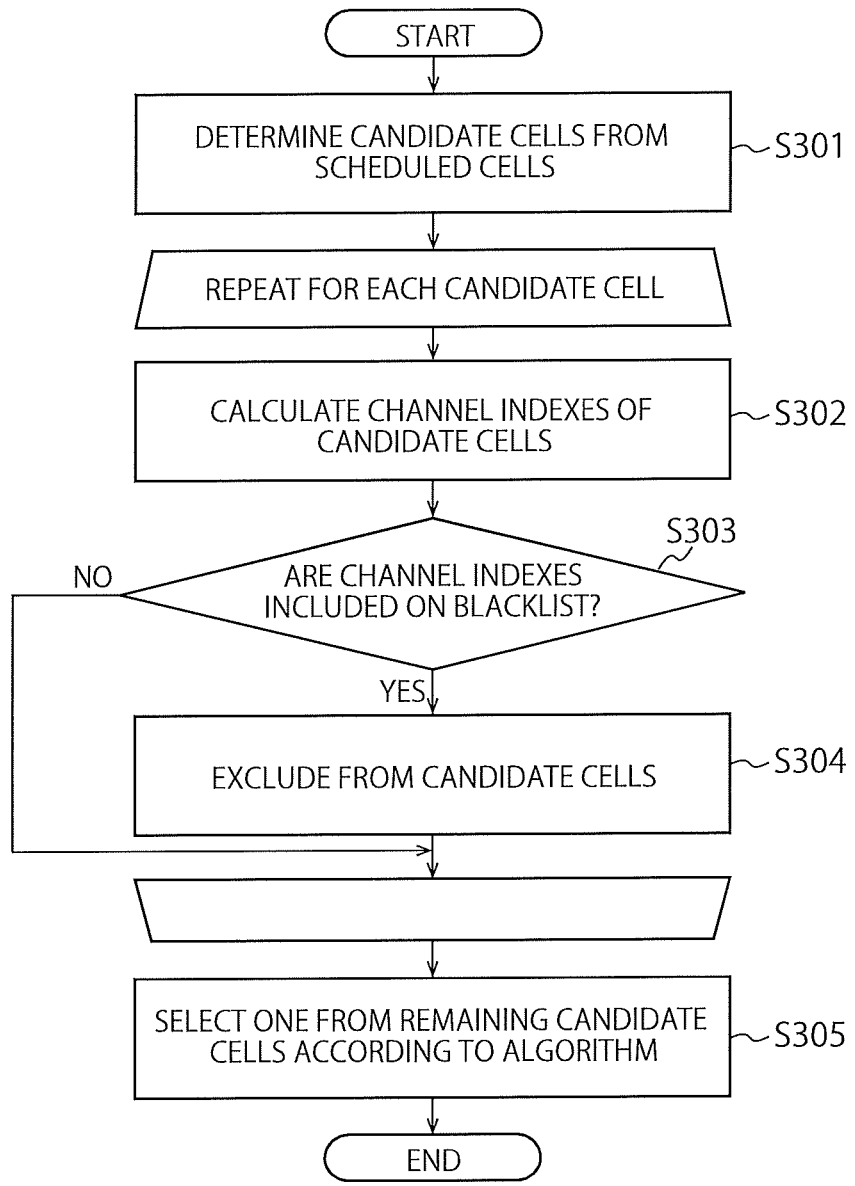
FIG. 8 is a schematic flowchart of channel selection processing.

FIG. 8 is a schematic flowchart of channel selection processing. The flow of FIG. 8 is performed by the use channel determinator 124.

The use channel determinator 124 refers to the TSCH schedule, and determines the scheduled cell in the target time slot as the candidate cell (S301). When transmitting the packet, the use channel determinator 124 includes scheduled cell having the "Tx" flag in the candidate cells. When receiving the packet, the use channel determinator 124 includes scheduled cell having the "Rx" flag in the candidate cells. For example, when the node A transmits the packet to the node B in the time slot "1", the use channel determinator 124 of the node A extracts the cell related to transmission to the node B among each of the cells of the time slot "1" from the TSCH schedule of the node A. In the case of the TSCH schedule of the node A illustrated in FIG. 5, the cell (0, 1), the cell (1, 1), the cell (2, 1), and the cell (3, 1) are extracted.

Similarly, when the node B receives the packet from the node A in the time slot "1", the use channel determinator 124 of the node B extracts the cell related to reception from the node A among each of the cells of the time slot "1" from the TSCH schedule of the node B. In the case of the TSCH schedule of the node B illustrated in FIG. 5, the cell (0, 1), the cell (1, 1), the cell (2, 1), and the cell (3, 1) are extracted.

Then, the use channel determinator 124 calculates the channel index of the candidate cell by each candidate cell (S302). When the channel index is included on the blacklist (YES in S303), the candidate cell is excluded from the candidate cells as being unusable (S304). More specifically, the cell is excluded from the candidate cells when the channel index is included in the transmission entry related to the communication partner in the case of transmission and when the channel index is included in the reception entry in the case of reception. If not (NO in S303), the processing is shifted to a process for the next candidate cell. In the manner described above, all the candidate cells are determined to be usable or not, and the unusable cell is excluded from the candidate cells.

After all of the candidate cells are determined to be useable or not, only the usable cells remain as the candidate cells. Then, the use channel determinator 124 selects one of the candidate cells according to a specific algorithm for selecting one candidate cell. Thereby, the channel to be used is determined (S305).

Note that these flowcharts are examples, and the order and the like of the processing are not limited as long as the required processing results can be acquired therewith. Further, the processing results of each processing may be stored in the storage 13 at any time, and each structural component may acquire the processing results by referring to the storage 13. This is also the same in the flowcharts hereinafter.

With the above-described processing alone, the channel registered on the blacklist becomes unusable thereinafter and the quality indicator regarding the channel is not to be updated. Therefore, even when the quality of the channel is improved after being registered on the blacklist, the channel is remained unusable.

Therefore, when the quality of the channel included on the blacklist is improved, the channel may also be excluded from the blacklist. For example, while the use channel determinator 124 normally does not determine the channel that is useable but included on the blacklist as the useable channel. However, there may also be a case where the use channel determinator 124 determines such channel as the channel to be used, as an exceptional measure. In the manner, the quality of the channel included on the blacklist can be measured continuously so as to be able to recognize that the quality is improved.

With communications using the channel included on the blacklist, there is a high possibility of being affected by an interference radio wave. Therefore, not the packet regarding the application data but a packet for investigating the quality such as a probing packet may be transmitted.

The exceptional measure may be taken regularly or may be taken when a specific condition is satisfied. For example, it is considered to introduce a cell from which the restriction of the channel according to the blacklist is intentionally lifted.

An example of the method for taking the exceptional measure will be described. FIG. 9 is a schematic diagram illustrating examples of the TSCH schedule when taking the exceptional measure. The TSCH schedules in FIG. 9 are different from the TSCH schedules in FIG. 5 in respect that the cell (0, 3) has a flag of "NoBL." The "NoBL" flag is a disregard flag indicating to disregard the blacklist. In determining whether the cell having the disregard flag is useable or not, the nodes disregards the blacklist, i.e. it accepts the cell as useable regardless of the blacklist.

Figure 10:
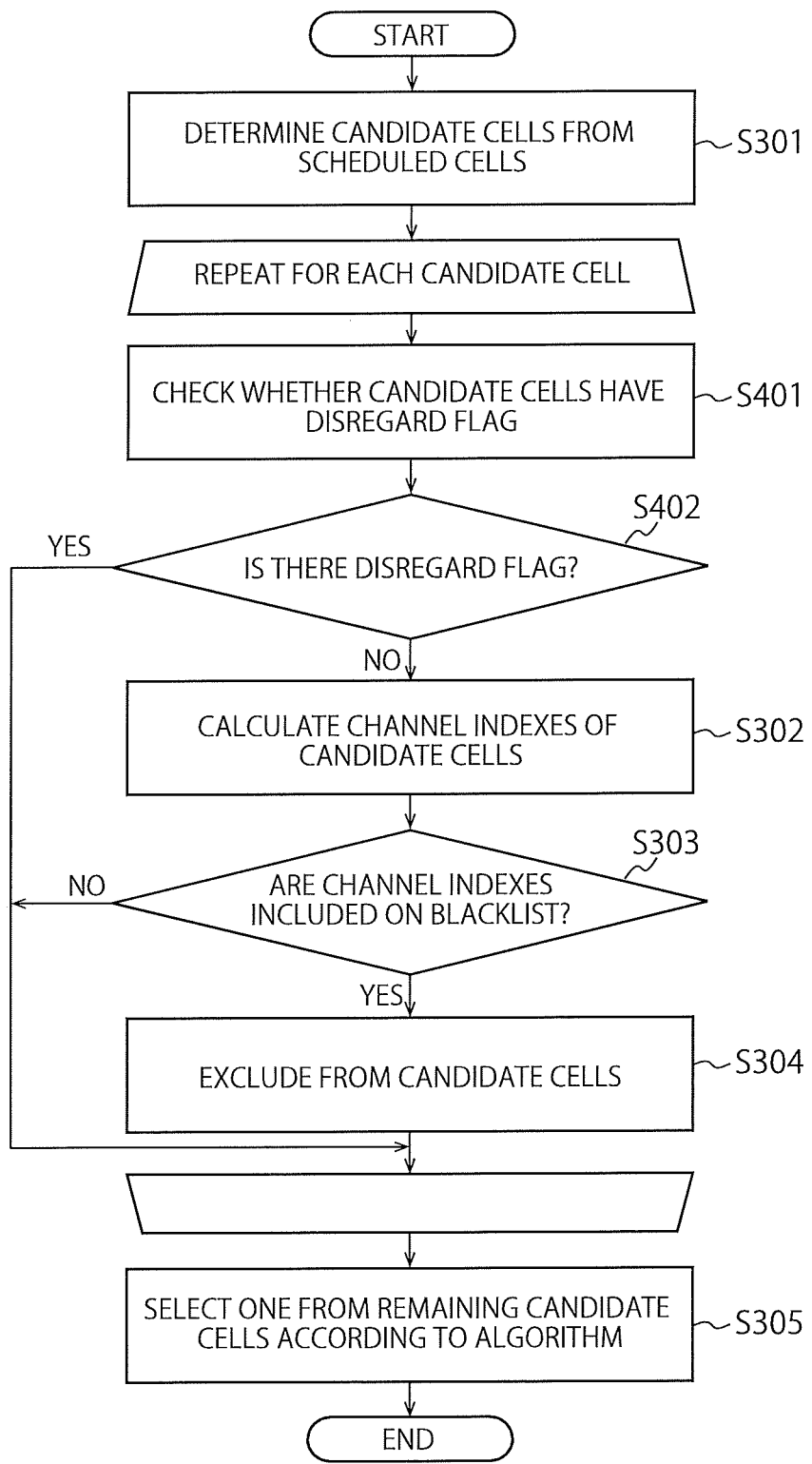
FIG. 10 is a schematic flowchart of channel selection processing when taking an exceptional measure.

FIG. 10 is a schematic flowchart of channel selection processing when taking the exceptional measure. The processing is different from the normal channel processing of FIG. 8 in respect that another processing is added before a series of processing (from S302 to S304) for checking whether or not the cell is useable by each of candidate cells and excluding the unusable cell from the candidate cells. In this flow, the excluding processing from the candidate cells is skipped when it is checked whether or not the candidate cell has the disregard flag (S401) and found that there is the disregard flag (YES in S402). When there is no disregard flag (NO in S402), the channel index of the candidate cell is calculated (S302) like the normal channel selection processing. Other than that, the flowchart is the same as that of the normal selection.

Thereby, when the cell (0, 3) is selected, the channel included on the blacklist is also used. As described above, the channel corresponding to the cell (0, 3) is switched according to ASN of the time slot, so that all the channels are subjects of investigation even when only the cell (0, 3) has the "NoBL" flag.

Thereby, the channel quality table of the channel included on the blacklist is updated. Normally, the blacklist updater 123 includes the channel in the reception entry of the blacklist when the quality indicator of a certain channel satisfies the condition for being registered on the blacklist. With the exceptional measure, however, the channel is excluded from the reception entry of the blacklist when the quality indicator of a certain channel satisfies the condition for being excluded from the blacklist. Thereby, the channel whose quality is improved can be used again.

It is enough to perform the processing for excluding the channel from the reception entry of the blacklist together with the processing for registering the channel to the reception entry of the blacklist. That is, the processing is performed together with the update processing of the reception entry (S107) illustrated in FIG. 6. Therefore, even in a case of taking the exceptional measure, there is no change in the flowchart illustrated in FIG. 6.

There may also be another method considered for taking the exceptional measure. For example, it is determined whether or not a "shared" flag defined with "IEEE 802.15.4 TSCH" is set in the scheduled cell. It is preferable to decide to perform channel selection according to the blacklist when the "shared" flag is not set.

Further, it is also possible to determine whether or not to take the exceptional measure according to "slotframe handle" defined with "IEEE 802.15.4 TSCH". When "slotframe handle" of "slotframe" where the scheduled cell belongs is a specific value, it is considered to invalidate (or validate) the channel selection based on the blacklist.

As described above, the wireless communication device of the embodiment includes the blacklist, and determines the channel to be used on the basis of the blacklist and the TSCH schedule. This makes it possible to suppress deterioration in the communication success rate while preventing problems (load, delay, and the like) from being caused by update of the TSCH schedule.

Further, the wireless communication device of the embodiment transmits the reception entry of the black list to other wireless communication devices. Because it is unnecessary to transmit the whole blacklist, the communication volume of the wireless communication network can be suppressed. Further, through transmitting the reception entry of the blacklist by broadcasting, the communication efficiency can be improved further because there is no back-and-forth packet exchanges required in unicasting.

Further, when the quality of the channel registered on the blacklist is improved by taking the exceptional measure, the channel can be considered as useable again. This makes it possible to prevent deterioration in the communication efficiency because the number of useable channels is decreased as the time passes.

Second Embodiment

Figure 11:
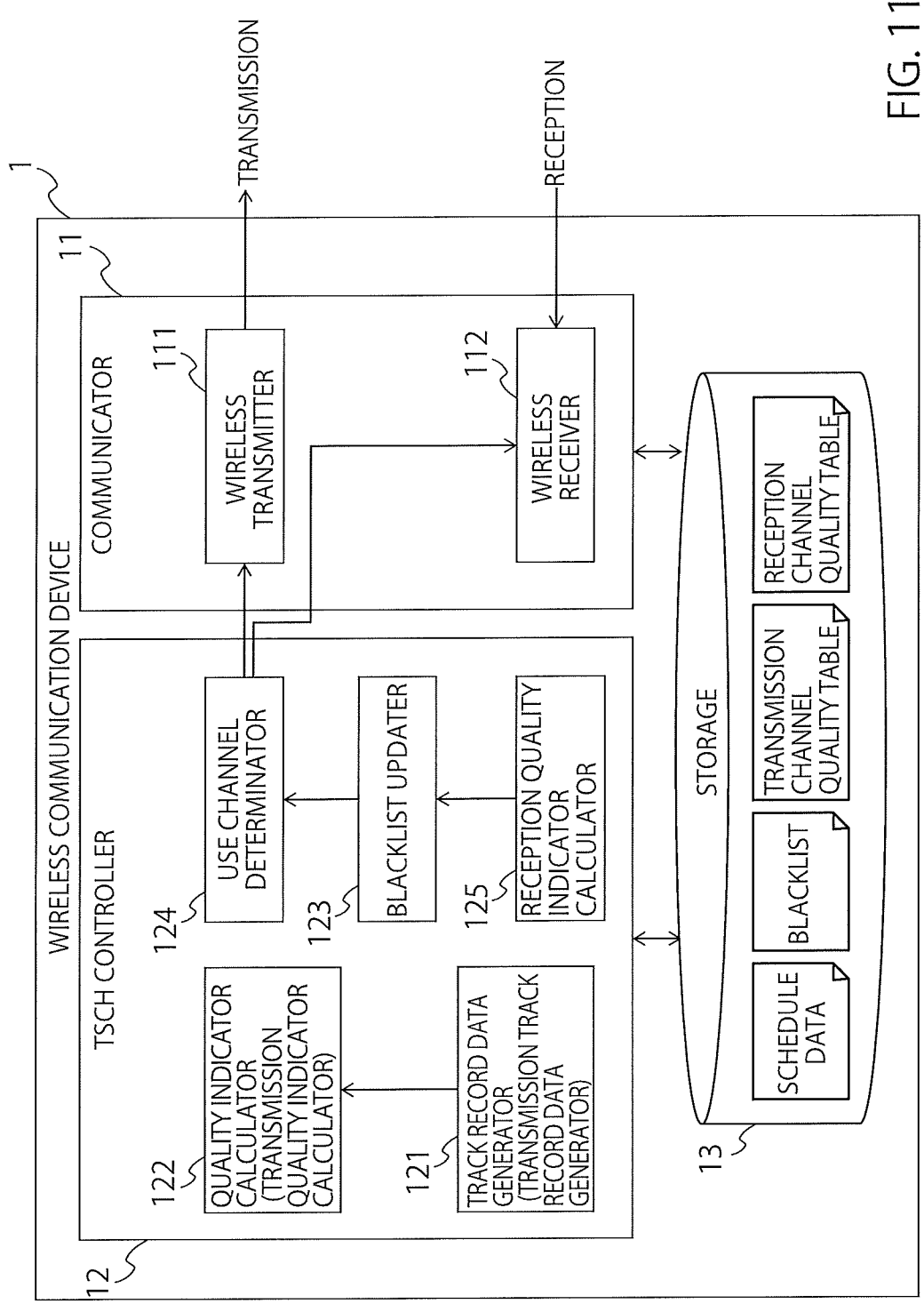
FIG. 11 is a block diagram illustrating an example of a wireless communication device according to a second embodiment.

FIG. 11 is a block diagram illustrating an example of a wireless communication device according to a second embodiment. In the second embodiment, the channel quality table used for updating the blacklist is different from that of the first embodiment, and a reception quality indicator calculator 125 for the processing thereof is provided further. Description of the same matters as those of the first embodiment will be omitted.

Each of the nodes of the first embodiment updates the reception entry on the basis of the packet transmitted from the own node to another node, and another node uses the entry as the transmission entry. That is, the channel used for the packet transmitted from the own node to another node is limited on the basis of the entry updated on the basis of the packet transmitted from another node to the own node. This method is effective when the channel quality is the same regardless of the directions of the wireless communications.

However, there may be a case where the channel quality for the packet transmitted from the own node to another node and the channel quality for the packet transmitted from another node to the own node are different. In such case, it is preferable to limit the channel used by the packet transmitted from another node to the own node on the basis of the entry updated on the basis of the packet transmitted from another node to the own node.

Therefore, in the second embodiment, each of the nodes updates the reception entry on the basis of the packet transmitted from another node to own node. That is, in the second embodiment, each of the nodes does not update the reception entry on the basis of the channel quality table generated by the own node but receives the channel quality table generated by another node and updates the reception entry based thereupon. Hereinafter, the channel quality for the packet transmitted from the own node to another node is referred to as a transmission channel quality, and the channel quality of the packet transmitted from another node to the own node is referred to as a reception channel quality.

Therefore, in the second embodiment, the channel quality tables are managed by classifying the tables into a transmission channel quality table indicating the transmission channel quality and a reception channel quality table indicating the reception channel quality. Note that the track record data and the quality indicator within the transmission channel quality table are referred to as transmission track record data and transmission quality indicator, respectively. The track record data and the quality indicator within the reception channel quality table are referred to as reception track record data and reception quality indicator, respectively.

The track record data generator 121 and the quality indicator calculator 122 of the first embodiment calculate the track record data and the quality indicator for the transmission packet, respectively. Therefore, the channel quality table of the first embodiment corresponds to the transmission channel quality table. In the second embodiment, the transmission channel quality table is generated also in the same manner as that of the first embodiment. Therefore, the track record data generator 121 is also called the transmission track record data generator 121, and the quality indicator calculator 122 as the transmission quality indicator calculator 122. In the second embodiment, the transmission channel quality table is generated by distinguishing the destinations of the packets.

FIG. 12 is a table illustrating an example of the transmission channel quality table. Unlike the channel quality table of the first embodiment illustrated in FIG. 2, the transmission channel quality table has an item of "destination", and entries are separated for each of the destinations and each of the channel indexes.

Unlike the first embodiment, each of the nodes transmits the transmission channel quality to neighboring nodes in the second embodiment. Then, each of the nodes uses the received transmission channel quality table as the reception channel quality table.

Figure 13:
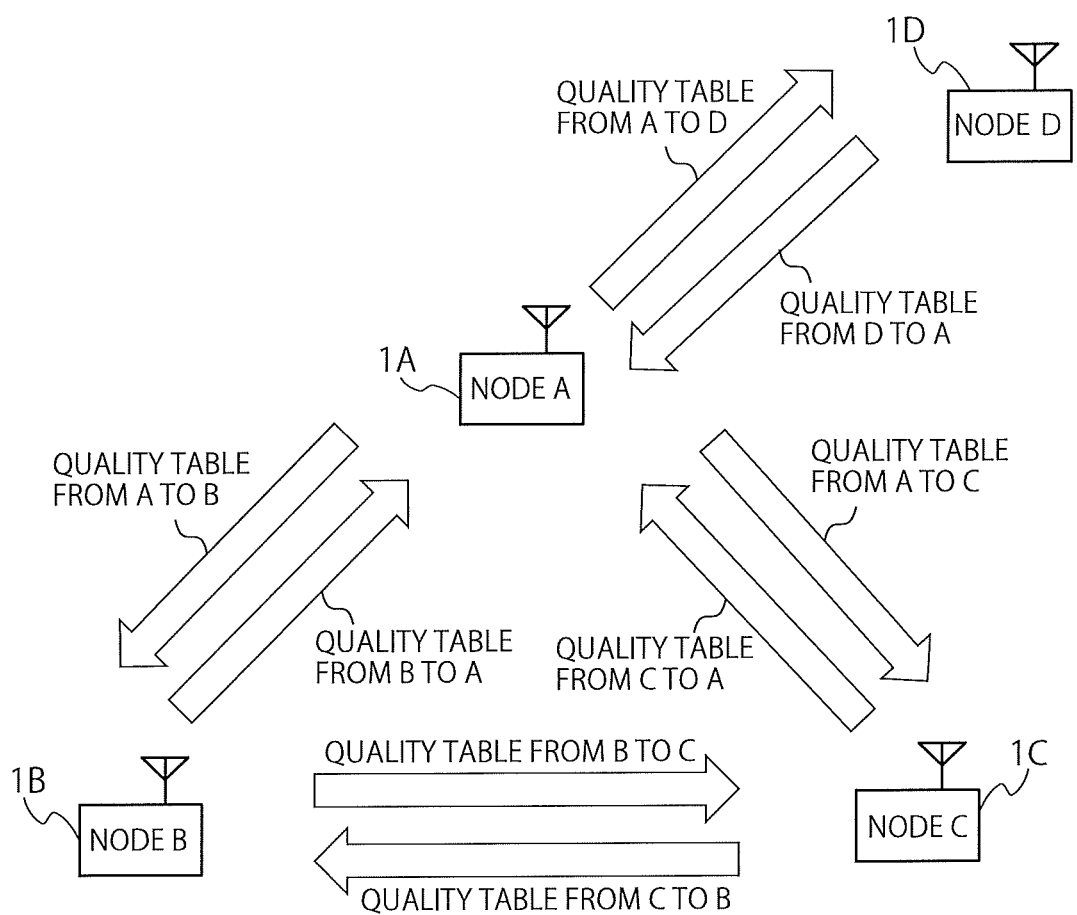
FIG. 13 is a chart for describing transmission of the channel quality table.

FIG. 13 is a chart for describing transmission of the channel quality table. The node A transmits the transmission channel quality table having the node B as the destination (the quality table from A to B) to the node B. That is, the entries where the destination is "B" in FIG. 12 (the first row to the fourth row) are transmitted to the node B. For the node B, those entries indicate the quality for the reception packet. Therefore, the node B uses the received entries as the reception channel quality table. In the manner described above, the reception channel quality is acquired from another node. In other words, the track record data regarding wireless transmission from another node and the quality indicator based on the track record data are acquired. While it is assumed herein that the whole channel quality table is transmitted and received, it is also possible to retransmit and receive at least either the track record data or the quality indicator.

While the communication volume can be suppressed by transmitting only the entry necessary for the communication partner as in FIG. 13, it is also possible for the transmission node to transmit the transmission channel quality table without omitting the unnecessary entry (for example, the entry having another node as the destination) and to delete the unnecessary entry after the reception node receives the transmission channel quality table. In such case, it is preferable to transmit the transmission channel quality at once to the neighboring nodes by broadcasting.

Incidentally, each of the nodes may simply replace the existing reception channel quality table with the newly received channel quality table. That is, the blacklist updater 123 may update the reception entry of the blacklist on the basis of the quality indicator of the newly received channel quality table. Alternatively, the blacklist updater 123 may update the quality indicator on the basis of the existing reception channel quality table and the newly received channel quality table.

When the existing reception channel quality table is not replaced with the newly received channel quality table, the reception quality indicator calculator 125 calculates the reception quality indicator. Specifically, the reception quality indicator calculator 125 updates the reception quality indicator on the basis of the quality indicator of the newly received channel quality table. Alternatively, the reception quality indicator calculator 125 updates the reception track record data and calculates the reception quality indicator on the basis of the updated reception track record data. There may be various methods considered for updating the reception track record data and the reception quality indicator. For example, the reception track record data may be updated by adding the total packet transmission number and the packet transmission success number shown in the newly received channel quality table to the existing reception track record data and the total packet transmission number, respectively. Alternatively, the moving average of the quality indicators shown in the channel quality tables received thus far may be calculated and taken as the new reception quality indicator.

Then, the blacklist updater 123 updates the reception entry of the blacklist on the basis of the updated reception quality indicator. Other processing can be performed in the same manner as that of the first embodiment.

Figure 14:
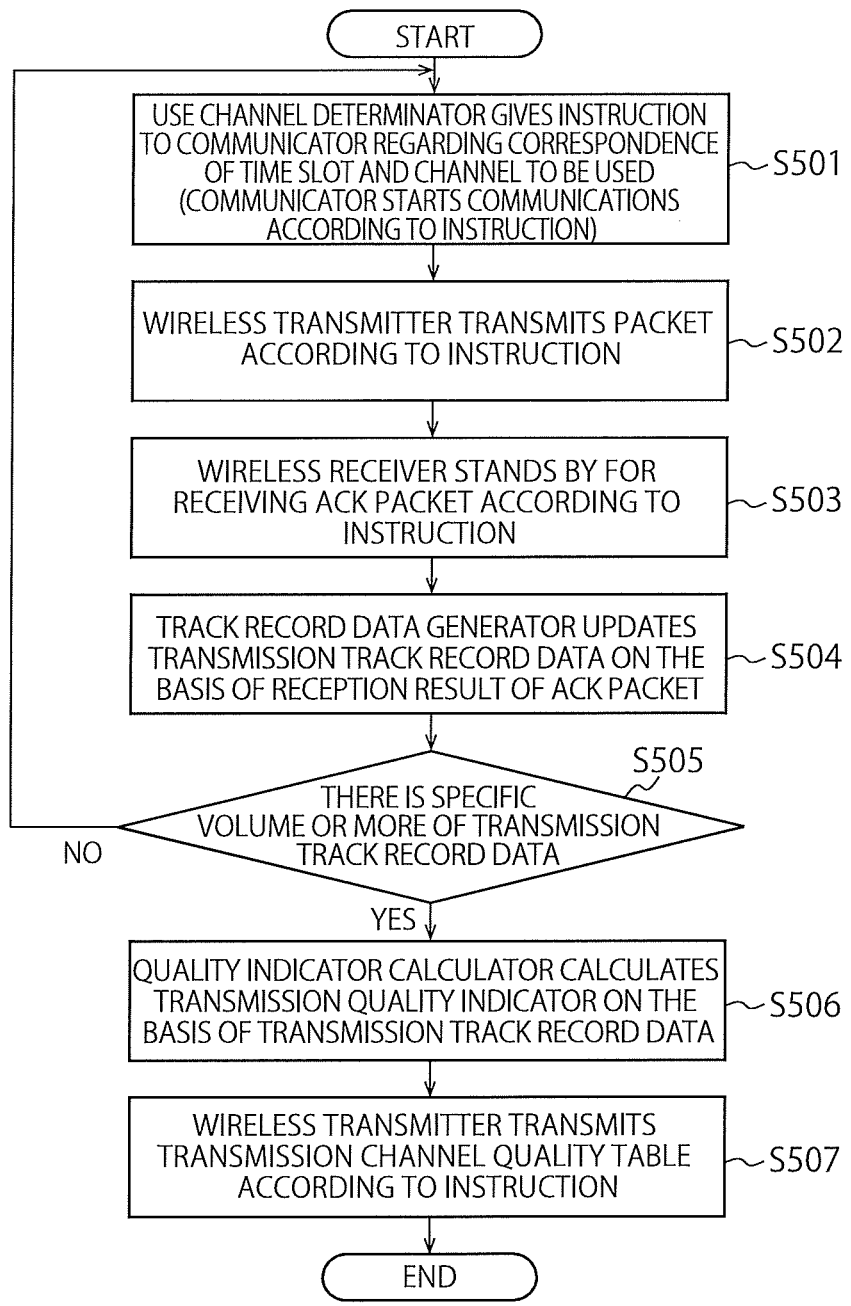
FIG. 14 is a schematic flowchart of a series of processing regarding transmission of the transmission channel quality table according to the second embodiment.

FIG. 14 is a schematic flowchart of a series of processing regarding transmission of the transmission channel quality table according to the second embodiment. The processing from S501 to S506 in FIG. 14 is the same as the processing from S101 to S106 of the flowchart illustrated in FIG. 6. As described above, the track record data of the first embodiment corresponds to the transmission track record data of the second embodiment, and the quality indicator of the first embodiment corresponds to the transmission quality indicator of the second embodiment.

The blacklist is not updated on the basis of the transmission quality indicator in the second embodiment, so that there is no processing corresponding to S107 of FIG. 6 in the flowchart. Further, unlike the first embodiment, the wireless transmitter 111 transmits the transmission channel quality table to the neighboring nodes in the time slot and the channel designated by the use channel determinator 124 (S507). The transmission channel quality table is used as the reception channel quality table in the neighboring nodes, and the reception entries of the blacklists of the neighboring nodes are updated.

Figure 15:
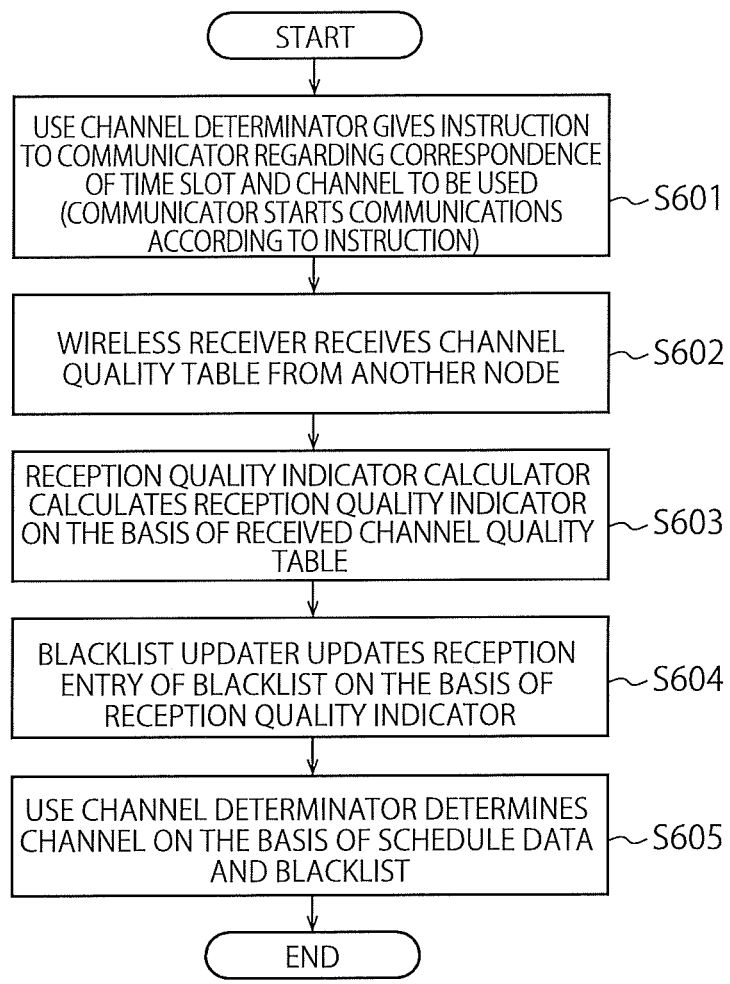
FIG. 15 is a schematic flowchart of a series of processing regarding update of a reception entry of a blacklist according to the second embodiment.

FIG. 15 is a schematic flowchart of a series of processing regarding update of the reception entry of the blacklist according to the second embodiment. In the flow, there is assumed a case where the reception quality indicator calculator 125 calculates the reception quality indicator anew.

The use channel determinator 124 gives an instruction to the communicator 11 regarding correspondence of the time slot and the channel to be used (S601). The communicator 11 starts communications according to the instruction. The wireless receiver 112 receives the channel quality table from another node (S602). The reception quality indicator calculator 125 calculates the reception quality indicator on the basis of the received channel quality table (S603). The blacklist updater 123 updates the reception entry of the blacklist on the basis of the calculated reception quality indicator (S604). Then, the use channel determinator 124 determines the channel to be used on the basis of the schedule data and the blacklist.

There is no difference between the second embodiment and the first embodiment regarding the schematic flowchart of a series of processing regarding update of the transmission entry of the blacklist and the flowchart of channel selection considering the blacklist, so that description thereof is omitted.

As described above, in the embodiment, the reception entry of the blacklist is updated based not on the track record data of the own node but on the track record data and the like of another node. Thereby, it is possible to update the blacklist on which the channel quality is more accurately reflected even when the channel quality varies depending on the directions of wireless communications, so that a still higher communication success rate can be maintained.

Further, each of the processing in the embodiments described above may be achieved by a dedicated circuit or achieved by using software (program). In a case of using the software (program), the embodiments described above can be achieved by using a multi-purpose computer device as basic hardware, and having a processor such as a central processing unit (CPU) loaded on the computer device execute the program, for example.

Figure 16:
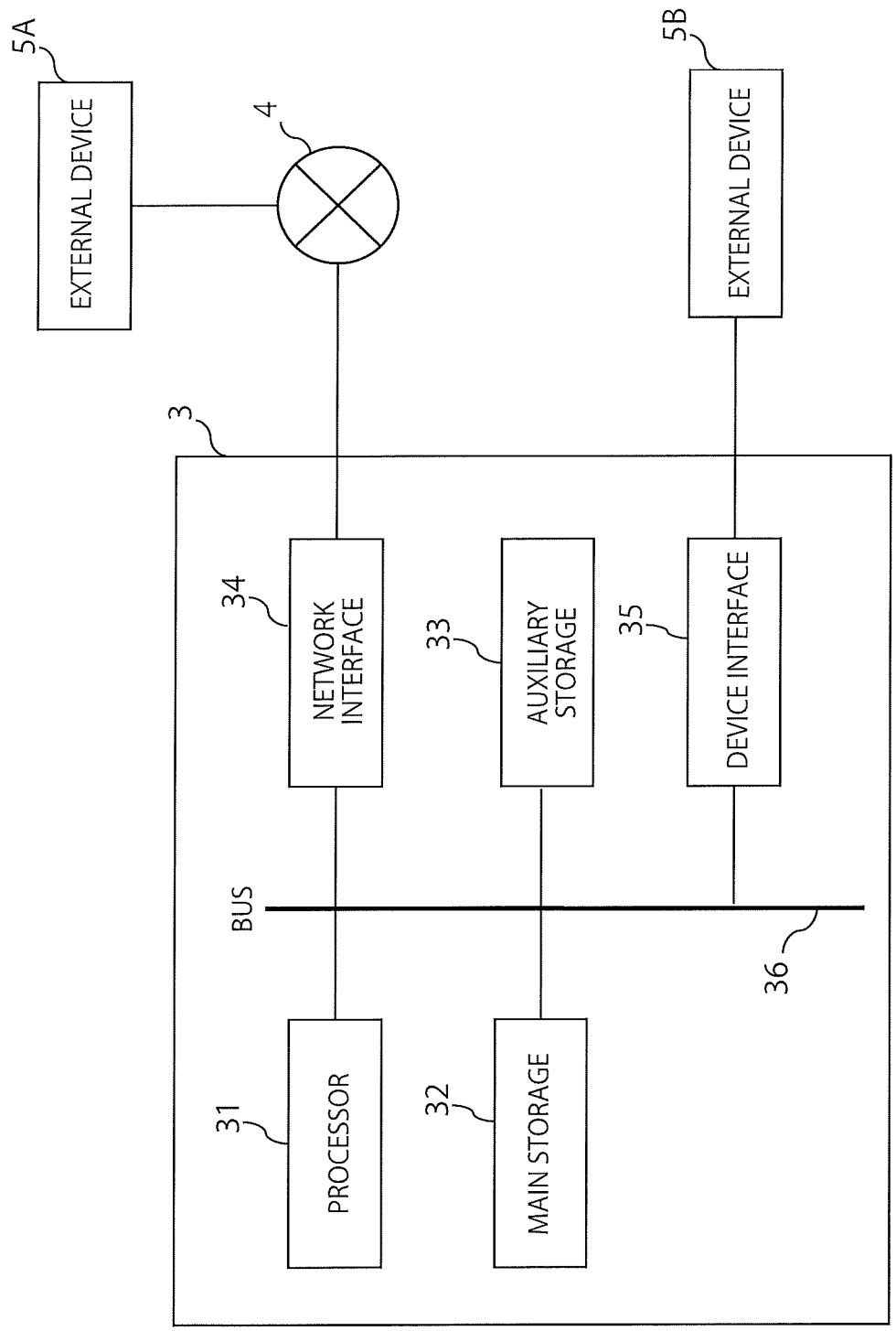
FIG. 16 is a block diagram illustrating an example of a hardware configuration according to an embodiment of the present invention.

FIG. 16 is a block diagram illustrating an example of a hardware configuration according to an embodiment of the present invention. The wireless communication device 1 can be achieved as a computer device 3 that includes a processor 31, a main storage 32, an auxiliary storage 33, a network interface 34, and a device interface 35, and those are connected via a bus 36. While the computer device includes one each of those structural components in FIG. 16, it is also possible to have a plurality of the same structural components.

The structural components of the wireless communication device 1 according to the embodiment may be achieved by dedicated electronic circuits (that is, hardware) such as ICs (Integrated Circuits) on which a processor, a memory, and the like are mounted. For example, the wireless communication device 1 may include a transmission circuit achieving the wireless transmitter 111, a reception circuit achieving the wireless receiver 112, and a processing (control) circuit achieving the TSCH controller 12. The inside configuration of the TSCH controller 12 also may be achieved by a dedicated circuit. Alternatively, the structural components may be achieved by using software (program). In a case of using the software (program), the embodiments described above can be achieved by using a multi-purpose computer device as basic hardware, and having a processor such as a central processing unit (CPU) loaded on the computer device execute the program, for example.

The terms used in the embodiments are to be interpreted broadly. For example, the term "processor" may include a multi-purpose processor, a central processing unit (CPU), a microprocessor, a digital signal processor (DSP), a controller, a microcontroller, a state machine, and the like. Depending on the situation, the "processor" may indicate a specific-use integrated circuit, a field programmable gate array (FPGA), a programmable logic device (PLD), or the like. The "processor" may indicate a combination of a plurality of processing devices such as microprocessors, a combination of DSP and the microprocessor, or one or more microprocessor operating in cooperation with a DSP core.

As another example, the term "memory" may include an arbitrary electronic component capable of storing electronic information. The "memory" may indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, a magnetic or optical data memory. That is, the storage 13 may be a memory or a storage. Those can be read by the processors. When the processor reads out the information, writes the information, or performs the both from/to the memory, it can be said that the memory electrically communicates with the processor. The memory may be integrated with the processor. In such case, it can also be said that the memory is electrically communicating with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device for performing wireless communications with a communication partner while switching a channel to be used for each of time slots according to pre-generated schedule data, the channel being selected from among channels that are allowable for the wireless communication device and that are unallowable for the other communication devices that follow the schedule data, the wireless communication device comprising:
   a storage configured to store the scheduling data;
   a blacklist updater configured to determine whether or not each of the allowable channels indicated in the scheduling data is actually usable, and to register the channel determined as unusable on a blacklist without changing the scheduling data and resharing the scheduling data with the other communication devices that follow the schedule data;
   a use channel determinator configured to determine the channel to be used in each of the time slots on the basis of the scheduling data and the blacklist; and
   a communicator configured to perform the wireless communications with the communication partner by using the channel determined in each of the time slots, wherein:
   the blacklist includes a reception entry indicating the channel that is unusable when receiving a packet from the communication partner and a transmission entry indicating the channel that is unusable when transmitting a packet to the communication partner; and
   the use channel determinator determines the channel to be used when receiving the packet from the communication partner from channels that are indicated as allowable in of the scheduling data and that are not included in the reception entry, and determines the channel to be used when transmitting the packet to the communication partner from channels that are indicated as allowable in the scheduling data and that are not included in the transmission entry.

2. The wireless communication device according to claim 1, wherein:
   the communicator receives a reception entry of a blacklist of the communication partner from the communication partner; and
   the blacklist updater updates the blacklist to have the reception entry of the blacklist of the communication partner as the transmission entry of the blacklist.

3. The wireless communication device according to claim 2, wherein the communicator transmits the reception entry of the blacklist to the communication partner.

4. The wireless communication device according to claim 3, wherein the communicator transmits the reception entry of the blacklist by broadcasting.

5. The wireless communication device according to claim 2, further comprising:
   a track record data generator configured to generate first track record data regarding wireless transmission to the communication partner; and
   a transmission quality indicator calculator configured to calculate a transmission quality indicator indicating a transmission quality of each of the channels used for wireless transmission with the communication partner on the basis of the first track record data, wherein the blacklist updater updates the reception entry on the basis of the transmission quality indicator.

6. The wireless communication device according to claim 5, wherein:

the use channel determinator determines a first channel included in the scheduling data and the blacklist as the channel to be used;

the communicator performs the wireless communications with the communication partner via the first channel;

the track record data generator generates third track record data regarding wireless transmission to the communication partner via the first channel;

the transmission quality indicator calculator calculates the transmission quality indicator of the first channel on the basis of the third track record data; and the blacklist updater excludes the first channel from the reception entry when the transmission quality indicator of the first channel satisfies a prescribed condition.

7. The wireless communication device according to claim 6, wherein:

the first channel in the scheduling data includes a flag indicating that the first channel even when included on the blacklist may be determined as the channel to be used; and the use channel determinator determines the first channel as the channel to be used only when the first channel has the flag.

8. The wireless communication device according to claim 2, further comprising a reception quality indicator calculator configured to calculate a reception quality indicator regarding a reception quality of each of the channels included in the scheduling data, wherein:

the communicator receives, from the communication partner, at least one of second track record data and a calculation value calculated therefrom, the second track record data being regarding wireless transmission from the communication partner using each of the channels included in the scheduling data;

the reception quality indicator calculator calculates the reception quality indicator on the basis of at least one of the second track record data and the calculation value; and the blacklist updater updates the reception entry on the basis of the reception quality indicator.

9. The wireless communication device according to claim 8, further comprising:

a track record data generator configured to generate first track record data regarding wireless transmission to the communication partner via each of the channels included in the scheduling data; and a transmission quality indicator calculator configured to calculate a transmission quality indicator regarding a transmission quality of each of the channels included in the scheduling data on the basis of the first track record data, wherein the communicator transmits at least one of the first track record data and the transmission quality indicator to the communication partner.

10. A wireless communication method for performing wireless communications with a communication partner while switching a channel to be used for each of time slots according to pre-generated schedule data, the channel being selected from among channels that are allowable for the wireless communications and that are unallowable for the other communication devices that follow the schedule data, the wireless communication method comprising:

acquiring the scheduling data;

determining whether or not each of the allowable channels indicated in the scheduling data is actually usable;

registering the channel determined as unusable on a blacklist without changing the scheduling data and resharing the scheduling data with the other communication devices that follow the schedule data;

determining the channel to be used in each of the time slots on the basis of the scheduling data and the blacklist; and performing the wireless communications with the communication partner by using the channel determined in each of the time slots, wherein:

the blacklist includes a reception entry indicating the channel that is unusable when receiving a packet from the communication partner and a transmission entry indicating the channel that is unusable when transmitting a packet to the communication partner; and in determining the channel to be used in each of the time slots, the channel to be used when receiving the packet from the communication partner is determined from channels that are indicated as allowable in the scheduling data and that are not included in the reception entry, and the channel to be used when transmitting the packet to the communication partner is determined from channels that are indicated as allowable in the scheduling data and that are not included in the transmission entry.

11. A non-transitory computer readable medium storing a program executed by a computer for performing wireless communications with a communication partner while switching a channel to be used for each of time slots according to pre-generated schedule data, the channel being selected from among channels that are allowable for the wireless communications and that are unallowable for the other communication devices that follow the schedule data, the program causing the computer to execute:

acquiring the scheduling data;

determining whether or not each of the allowable channels indicated in the scheduling data is actually usable;

registering the channel determined as unusable on a blacklist without changing the scheduling data and resharing the scheduling data with the other communication devices that follow the schedule data;

determining the channel to be used in each of the time slots on the basis of the scheduling data and the blacklist; and performing the wireless communications with the communication partner by using the channel determined in each of the time slots, wherein:

the blacklist includes a reception entry indicating the channel that is unusable when receiving a packet from the communication partner and a transmission entry indicating the channel that is unusable when transmitting a packet to the communication partner; and in determining the channel to be used in each of the time slots, the channel to be used when receiving the packet from the communication partner is determined from channels that are indicated as allowable in the scheduling data and that are not included in the reception entry, and the channel to be used when transmitting the packet to the communication partner is determined from channels that are indicated as allowable in the scheduling data and that are not included in the transmission entry.

* * * * *